(12) United States Patent
Chen et al.

(10) Patent No.: US 11,307,459 B2
(45) Date of Patent: Apr. 19, 2022

(54) DISPLAY DEVICE COMPRISING A SWITCHABLE DIFFUSER AND A BACKLIGHT MODULE HAVING A FIRST REGION AND A SECOND REGION, AND A MOBILE DEVICE COMPRISING THE SAME

(71) Applicant: Innolux Corporation, Miao-Li County (TW)

(72) Inventors: Minghuang Chen, Miao-Li County (TW); Chuan-Chi Chien, Miao-Li County (TW); Yun-Hsin Chang, Miao-Li County (TW); I-An Yao, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/180,667

(22) Filed: Feb. 19, 2021

(65) Prior Publication Data

US 2021/0349251 A1 Nov. 11, 2021

(30) Foreign Application Priority Data

May 7, 2020 (CN) .......................... 202010376395.0

(51) Int. Cl.
| | |
|---|---|
| *G02F 1/13357* | (2006.01) |
| *F21V 8/00* | (2006.01) |
| *G02F 1/157* | (2006.01) |
| *G02F 1/1334* | (2006.01) |
| *G02F 1/137* | (2006.01) |
| *G02F 1/1677* | (2019.01) |
| *G02F 1/167* | (2019.01) |
| *G02F 1/15* | (2019.01) |

(52) U.S. Cl.
CPC ..... *G02F 1/133606* (2013.01); *G02B 6/0036* (2013.01); *G02B 6/0041* (2013.01); *G02B 6/0051* (2013.01); *G02B 6/0053* (2013.01); *G02B 6/0055* (2013.01); *G02F 1/1334* (2013.01); *G02F 1/13756* (2021.01); *G02F 1/157* (2013.01); *G02F 1/1677* (2019.01); *G02F 1/15* (2013.01); *G02F 1/167* (2013.01)

(58) Field of Classification Search
CPC .......... G02B 626/08; G02F 1/15–1525; G02F 1/165–1673; G02F 2203/62
See application file for complete search history.

(56) References Cited

U.S. PATENT DOCUMENTS

| | | |
|---|---|---|
| 2013/0135560 A1 | 5/2013 | Lee et al. |
| 2016/0356743 A1 | 12/2016 | Miki et al. |

(Continued)

FOREIGN PATENT DOCUMENTS

CN 110346970 10/2019

*Primary Examiner* — Keith G. Delahoussaye
(74) *Attorney, Agent, or Firm* — JCIPRNET (57) ABSTRACT

A display device and a mobile device are provided. The display device includes a display panel, a backlight module, and a switchable diffuser. The backlight module has a first region and a second region. The backlight module includes a reflector and optical layers. The reflector includes a non-reflecting portion in the first region and a reflecting portion in the second region. The optical layers are disposed on the reflector. The switchable diffuser is disposed between the display panel and the backlight module. At least one of the optical layers includes different structures in the first region and the second region.

19 Claims, 3 Drawing Sheets

(56) References Cited

U.S. PATENT DOCUMENTS

| | | | |
|---|---|---|---|
| 2020/0186688 A1* | 6/2020 | Chen | G02F 1/133512 |
| 2020/0192148 A1* | 6/2020 | Kim | G02F 1/133512 |
| 2020/0292871 A1* | 9/2020 | Inoue | G02F 1/133512 |

* cited by examiner

DISPLAY DEVICE COMPRISING A SWITCHABLE DIFFUSER AND A BACKLIGHT MODULE HAVING A FIRST REGION AND A SECOND REGION, AND A MOBILE DEVICE COMPRISING THE SAME

CROSS-REFERENCE TO RELATED APPLICATION

This application claims the priority benefit of China application serial no. 202010376395.0, filed on May 7, 2020. The entirety of the above-mentioned patent application is hereby incorporated by reference herein and made a part of this specification.

BACKGROUND

Technical Field

The disclosure relates to a display device and a mobile device.

Description of Related Art

Existing display devices are provided with front lens modules mainly by forming a slot on the front surface of the screen. This approach not only causes difficulties in module design, but also sacrifices the display area, making it impossible to achieve full-screen display.

SUMMARY

The disclosure provides a display device and a mobile device that may achieve full-screen display.

According to an embodiment of the disclosure, a display device includes a display panel, a backlight module, and a switchable diffuser. The backlight module has a first region and a second region. The backlight module includes a reflector and a plurality of optical layers. The reflector has a non-reflecting portion in the first region and a reflecting portion in the second region. The plurality of optical layers are disposed on the reflector. The switchable diffuser is disposed between the display panel and the backlight module. At least one of the plurality of optical layers includes different structures in the first region and the second region.

According to an embodiment of the disclosure, a mobile device includes a display device and an optical sensor. The display device includes a display panel, a backlight module, and a switchable diffuser. The backlight module has a first region and a second region. The backlight module includes a reflector and a plurality of optical layers. The reflector has a non-reflecting portion in the first region and a reflecting portion in the second region. The plurality of optical layers are disposed on the reflector. The switchable diffuser is disposed between the display panel and the backlight module. At least one of the plurality of optical layers includes different structures in the first region and the second region. The optical sensor is disposed corresponding to the first region.

Based on the above description, in the embodiments of the disclosure, the film layers or elements in the backlight module are designed as partitioned structures, so that the optical sensor disposed corresponding to the first region may perform image acquisition (such as photographing or filming). In addition, the switchable diffuser is used to shield the optical sensor disposed corresponding to the first region, or to improve the disuniformity of light beam at the junction of the first region and the second region resulting from the first region and the second region having different structures in at least one of the plurality of optical layers, which helps reduce the difference in visual effects between the first region and the second region. Therefore, the display device and the mobile device according to the embodiments of the disclosure may reach full-screen display.

In order to make the above-mentioned features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure may be understood with reference to the following detailed description in combination with the accompanying drawings. It should be noted that, to facilitate the understanding of readers and the conciseness of the drawings, multiple drawings in the disclosure only depict a part of the electronic device or the display device, and specific elements in the drawings are not drawn according to the actual scale. In addition, the number and size of each element in the drawings are only for illustration, and are not used to limit the scope of the disclosure. For example, for the sake of clarity, the relative size, thickness, and position of each film layer, region, or structure may be reduced or enlarged.

Throughout the specification and appended claims of the disclosure, certain words are used to refer to specific elements. Persons skilled in the art should understand that electronic device manufacturers may refer to the same elements by different names. This document does not intend to distinguish those elements with the same function but different names. In the specification and claims below, the words "have" and "include" are open-ended words, so they should be interpreted as "include but is not limited to . . . "

The directional terms mentioned in this document, such as "upper", "lower", "front", "back", "left", "right", etc., are only directions with reference to the drawings. Therefore, the directional terms are used to illustrate, but not to limit the disclosure. It should be understood that when an element or film layer is said to be set "on" or "connected to" another element or film layer, the element or film layer may be directly on the other element or film layer, or directly connected to the other element or film layer, or there may be an intervening element or film layer between the two (indirect case). On the contrary, when an element or film layer is said to be "directly on" or "directly connected to" another element or film layer, there is no intervening element or film layer between the two.

The terms "approximately", "equal to", "equal", "same", "substantially", and "generally" usually mean falling within a 10% range of a given value or range, or mean falling within a 5%, 3%, 2%, 1% or 0.5% range of a given value or range. In addition, the expressions "the given range is the first numerical value to the second numerical value" and "the given range falls within the range of the first numerical value to the second numerical value" mean that the given range includes the first numerical value, the second numerical value, and the other values in between.

In some embodiments of the disclosure, terms related to coupling and connecting such as "connect", "interconnect", etc., unless specifically defined, may mean that two structures are in direct contact, or that two structures are not in direct contact, where other structures are set between these two structures. The terms about coupling and connection may also include the cases where both structures are movable or both structures are fixed. In addition, the terms "electrically connect" and "couple" include any direct and indirect electrical connecting means.

In the following embodiments, the same or similar elements will be denoted by the same or similar reference numerals, and repeated descriptions thereof will be omitted. In addition, as long as the features in different embodiments do not violate the spirit of the disclosure or conflict with each other, they may be arbitrarily mixed and matched, and simple equivalent changes and modifications made in accordance with the specification or claims are still within the scope of the disclosure. In addition, the terms "first" and "second" mentioned in the specification or claims are only used to name different elements or to distinguish different embodiments or ranges, and are not used to limit the upper limit or the lower limit of the number of elements, nor used to limit the manufacturing order or setup order of the elements.

The electronic device (or mobile device) according to the disclosure may include a display device, an antenna device, a sensing device, a light-emitting device, or a splicing device, but is not limited thereto. The electronic device (or mobile device) may include a bendable or flexible electronic device. The electronic device (or mobile device) may include, for example, a liquid crystal layer or a light-emitting diode. The light-emitting diode may include, for example, an organic light-emitting diode (OLED), a mini LED, a micro LED, a quantum dot LED (which may include QLED, QDLED), fluorescence, phosphor, other suitable materials, or a combination of the above, but is not limited thereto.

FIG. 1 to FIG. 6 are schematic partial sectional diagrams of a mobile device 1 according to different embodiments of the disclosure. The mobile device 1 of the disclosure may include a mobile phone, a tablet computer, a notebook computer, or a smart bracelet, but is not limited thereto. In addition to the general display mode, the mobile device 1 also has an image acquisition mode, and the mobile device 1 may switch between the display mode and the image acquisition mode.

Figure 1:
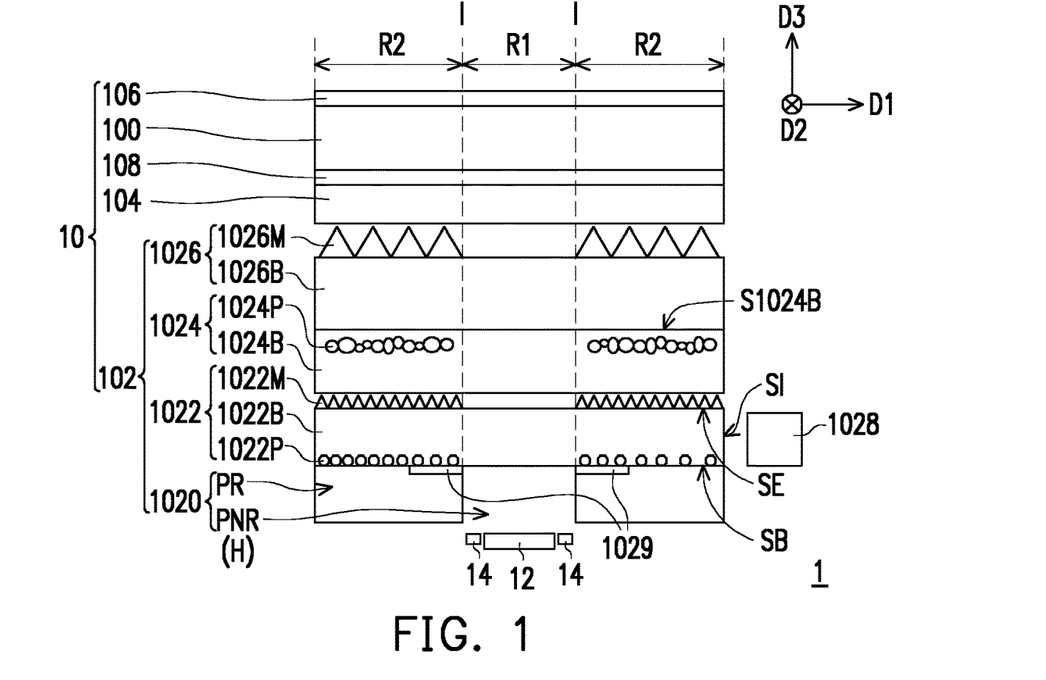
FIG. 1 to FIG. 6 are schematic partial sectional diagrams of a mobile device according to different embodiments of the disclosure.

Referring to FIG. 1 first, the mobile device 1 may include a display device 10 and an optical sensor 12. The display device 10 may provide a display screen. For example, the display device 10 may include a display panel 100, a backlight module 102, and a switchable diffuser 104.

The display panel 100 may be a non-self-luminous display panel, such as a liquid crystal display panel or a QDCF display panel, but is not limited thereto. The liquid crystal display panel may include an active element array substrate (not shown), a counter substrate (not shown), and a liquid crystal layer (not shown) disposed between the active element array substrate and the counter substrate, but is not limited thereto.

The backlight module 102 may provide light beams, and the backlight module 102 may have a first region R1 and a second region R2, and the first region R1 may be penetrated by the light beam outside the display device 10. In the display mode, the first region R1 and the second region R2 jointly provide light beams to the display panel 100, so as to achieve full-screen display. In the image acquisition mode, the light beam outside the display device 10 enters the mobile device 1 via the first region R1 and is received by the optical sensor 12. In the top view (not shown) of the mobile device 1, the shape of the first region R1 may be a circle, a triangle, a quadrilateral, a pentagon, or other polygons. The second region R2 is connected to the first region R1, and the second region R2 is, for example, located at the periphery of the first region R1. For example, the second region R2 may surround the first region R1, or the second region R2 may be located on one side, two sides, or more sides of the first region R1.

The backlight module 102 may be an edge-lit backlight module, so as to meet the trend of thinning, but is not limited thereto. Taking the edge-lit backlight module as an example, the backlight module 102 may include a reflector 1020, a plurality of optical layers (such as an optical layer 1022, an optical layer 1024, and an optical layer 1026), and a light-emitting element 1028, but is not limited thereto.

The reflector 1020 is disposed adjacent to the bottom of the display panel 100, and the reflector 1020 has a non-reflecting portion PNR in the first region R1 and a reflecting portion PR in the second region R2. The reflecting portion PR may reflect the light beam transmitted toward the bottom of the display device 10, so that the light beam is transmitted toward the display panel 100, thereby improving the utilization rate of light. For example, the reflecting portion PR may include a metal thin film, or the reflecting portion PR may include a combination of a light-transmitting substrate (not shown) and a reflective layer (not shown) formed on the light-transmitting substrate. The material of the light-transmitting substrate may include plastic, such as polyethylene terephthalate (PET), but is not limited thereto. The material of the reflective layer may include metal, alloy, or a combination thereof, but is not limited thereto.

The non-reflecting portion PNR may allow the light beam to penetrate, so that the optical sensor 12 may receive the light beam from outside the display device 10. For example, the non-reflecting portion PNR may be an opening H penetrating the reflector 1020. In other words, the reflector 1020 may form the opening H in the first region R1, and the opening H serves as the non-reflecting portion PNR, but is not limited thereto.

The plurality of optical layers are disposed on the reflector 1020. FIG. 1 schematically shows three optical layers, such as an optical layer 1022, an optical layer 1024, and an optical layer 1026, and the optical layer 1022, the optical layer 1024, and the optical layer 1026 are sequentially stacked on the reflector 1020. However, the number of the optical layers included in the backlight module 102 may be increased or decreased according to requirements, and the stacking order of the plurality of optical layers may be changed according to requirements.

In some embodiments, the optical layer 1022 may be a light guide plate. The light guide plate includes a light-transmitting body 1022B. The light-transmitting body 1022B has a light-incident surface SI, a light-emitting surface SE, and a bottom surface SB. The light-incident surface SI is located on the side surface of the light-transmitting body 1022B and is connected to the light-emitting surface SE and the bottom surface SB. The light-emitting surface SE and the bottom surface SB are opposite to each other, and the bottom surface SB is located between the light-emitting surface SE and the reflector 1020.

The light-emitting element 1028 is disposed adjacent to the light-incident surface SI. The number of the light-emitting elements 1028 included in the backlight module 102 may be one or more. For example, the light-emitting element 1028 may include a light tube extending in a second direction D2 or a light bar. The light bar may include a plurality of light-emitting devices (not shown) arranged in the second direction D2. The light-emitting device may include an OLED, a mini LED, a micro LED, a quantum dot LED, fluorescence, phosphor, other suitable materials, or a combination of the above, but is not limited thereto. The light beam (not shown) emitted by the light-emitting element 1028 enters the light guide plate via the light-incident surface SI. The light beam entering the light guide plate is transmitted in a direction away from the light-incident surface SI (such as a direction opposite to a first direction D1) by total internal reflection (TIR). The first direction D1 and the second direction D2 are both perpendicular to a normal direction D3 of the mobile device 1, and the first direction D1 and the second direction D2 intersect each other. As shown in FIG. 1, the first direction D1 and the second direction D2 may be perpendicular to each other, but are not limited thereto.

The light guide plate may further include a plurality of dots 1022P. The plurality of dots 1022P are disposed on the bottom surface SB of the light-transmitting body 1022B. In some embodiments, the plurality of dots 1022P may be formed on the bottom surface SB of the light-transmitting body 1022B by printing, but are not limited thereto. The plurality of dots 1022P may destroying TIR, so that the light beam transmitted in the light guide plate is output from the light guide plate via the light-emitting surface SE.

In some embodiments, the plurality of dots 1022P may be located in the second region R2, and the distribution density of the plurality of dots 1022P in the second region R2 may change according to the distance from the light-incident surface SI. For example, in the second region R2, the farther away from the light-incident surface SI, the more densely the plurality of dots 1022P are arranged, so as to improve the light emission uniformity, but the disclosure is not limited thereto.

The light guide plate may further include a plurality of microstructures 1022M. The plurality of microstructures 1022M are disposed on the light-emitting surface SE of the light-transmitting body 1022B. In some embodiments, the plurality of microstructures 1022M and the light-transmitting body 1022B may be integrally formed; for example, the plurality of microstructures 1022M and the light-transmitting body 1022B may be formed by molding, but are not limited thereto. In addition, the material of the plurality of microstructures 1022M and the light-transmitting body 1022B of the light guide plate may include polymethylmethacrylate (PMMA), polycarbonate (PC), or glass, but is not limited thereto.

In some embodiments, the plurality of microstructures 1022M may be located in the second region R2, and the size, pitch, or shape of the plurality of microstructures 1022M in the second region R2 may change according to requirements. For example, the microstructures 1022M may be columnar microstructures, and the plurality of columnar microstructures may be arranged along the first direction D1, and the columnar microstructures may extend along the second direction D2. In other embodiments, the plurality of columnar microstructures may be arranged along the second direction D2, and the columnar microstructures may extend along the first direction D1.

Figure 3:
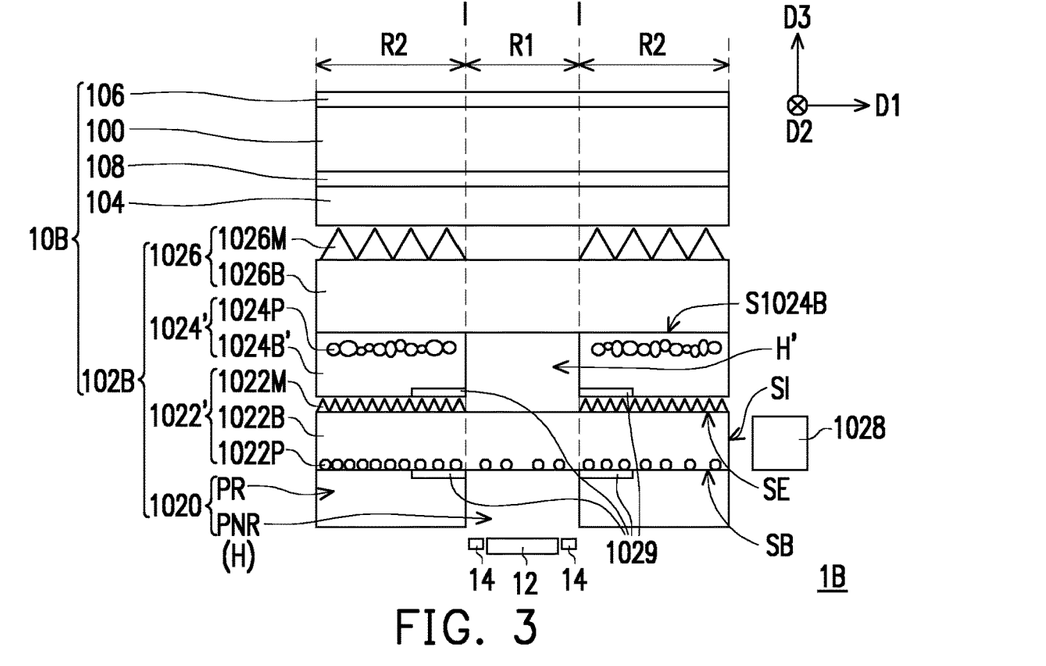
Figure 5:
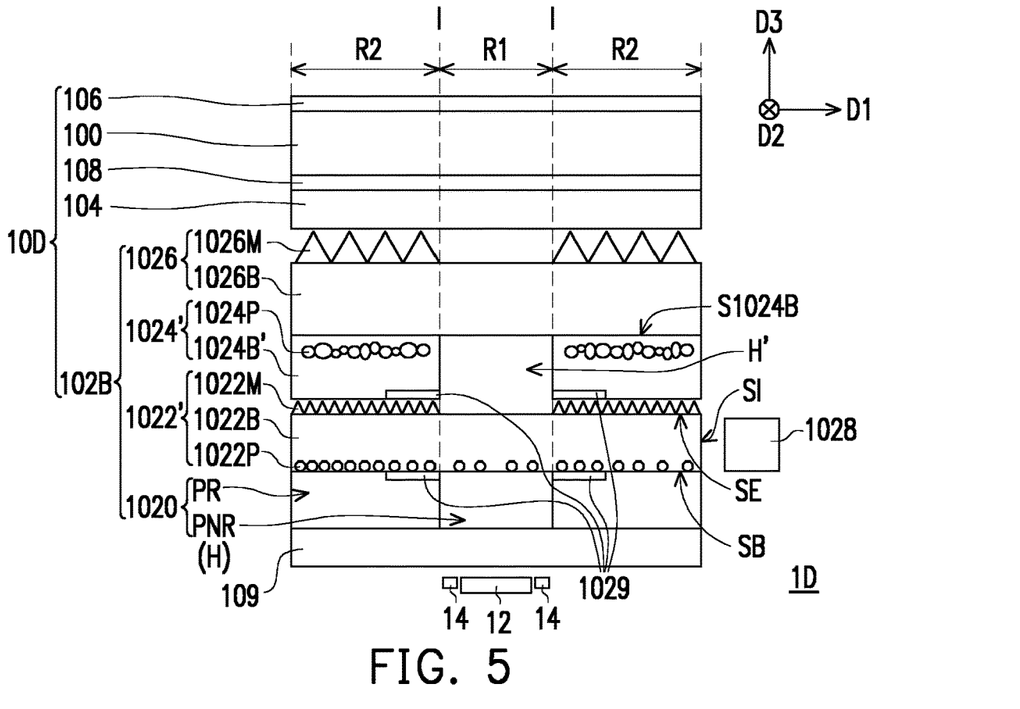
Figure 6:
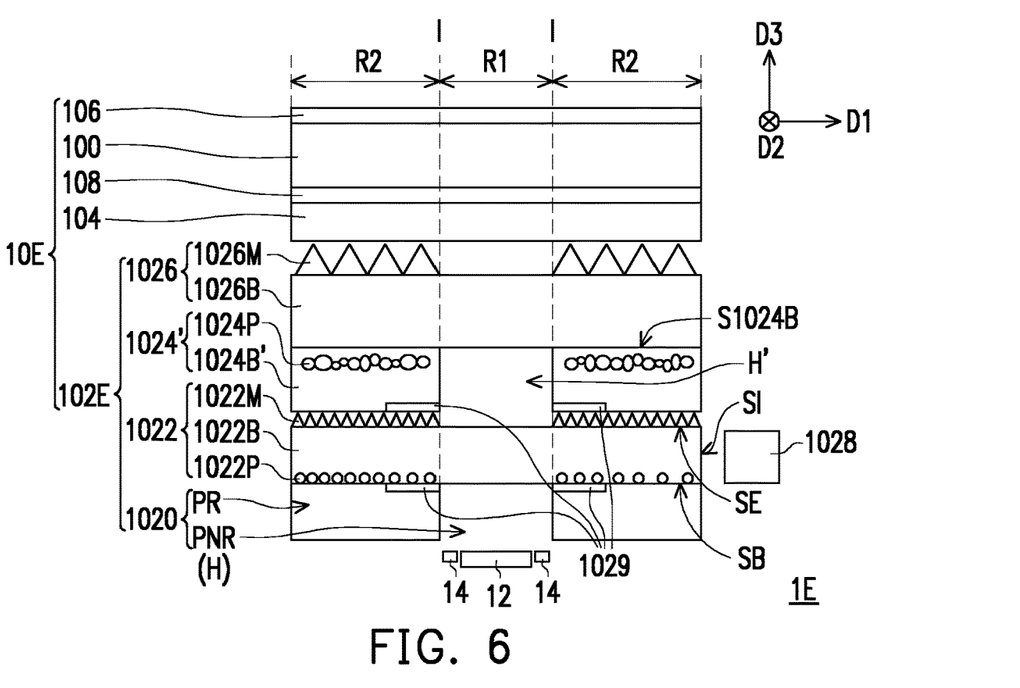

The optical layer 1022 may include different structures in the first region R1 and the second region R2. As shown in FIG. 1, the optical layer 1022 may include a non-pattern structure in the first region R1 and may include a pattern structure in the second region R2. In this document, the description "at least one of the plurality of optical layers (such as the optical layer 1022, the optical layer 1024, and the optical layer 1026) may include a non-pattern structure" means that no recessed microstructure, protruding microstructure, irregular light diffusing microstructure, light scattering particle, or the like is formed on the body (such as a light-transmitting body) of the at least one optical layer or in the body of the at least one optical layer, but the disclosure is not limited thereto. In some embodiments, the non-pattern structure of at least one of the plurality of optical layers (such as the optical layer 1022, the optical layer 1024, and the optical layer 1026) may also refer to an opening H' formed in the body of the at least one optical layer (as shown in FIG. 3, FIG. 5, and FIG. 6). On the other hand, the description "at least one of the plurality of optical layers (such as the optical layer 1022, the optical layer 1024, and the optical layer 1026) may include a pattern structure" means that recessed microstructures, protruding microstructures, irregular light diffusing microstructures, light scattering particles, or the like are formed on the body (such as the light-transmitting body) of the least one optical layer or in the body of the at least one optical layer, but the disclosure is not limited thereto. In FIG. 1, except for the light-transmitting body 1022B of the light guide plate, the optical layer 1022 does not further include the dots 1022P or the microstructures 1022M in the first region R1. On the other hand, the optical layer 1022 further includes the plurality of dots 1022P and the plurality of microstructures 1022M in the second region R2 in addition to the light-transmitting body 1022B of the light guide plate. By arranging the dots 1022P or the microstructures 1022M outside the first region R1 (such as in the second region R2), the transmission of the light beam from outside the display device 10 to the optical sensor 12 is facilitated or the formation of stray light may be reduced, thereby improving the image quality obtained by the optical sensor 12.

In some embodiments, the optical layer 1024 may be a diffuser. The diffuser may scatter the light beam to improve the light emission uniformity. For example, the diffuser may include a light-transmitting body 1024B and a plurality of light-scattering particles 1024P. The light-transmitting body 1024B may allow the light beam to penetrate. For example, the material of the light-transmitting body 1024B may include PET, but is not limited thereto. The plurality of light scattering particles 1024P may be coated on the light-transmitting body 1024B or doped in the light-transmitting body 1024B to scatter the light beam.

The optical layer 1024 may include different structures in the first region R1 and the second region R2. As shown in FIG. 1, the optical layer 1024 may include a non-pattern structure in the first region R1 and may include a pattern structure in the second region R2. Specifically, except for the light-transmitting body 1024B, the optical layer 1024 does not further include the light-scattering particles 1024P in the first region R1. On the other hand, the optical layer 1024 further includes the plurality of light-scattering particles 1024P in the second region R2 in addition to the light-transmitting body 1024B. By arranging the light-scattering particles 1024P outside the first region R1 (such as in the second region R2), the transmission of the light beam from outside the display device 10 to the optical sensor 12 is facilitated or the formation of stray light may be reduced, thereby improving the image quality obtained by the optical sensor 12.

In other embodiments, the diffuser (such as the optical layer 1024) may include a light-transmitting body 1024B. A surface 51024B of the light-transmitting body 1024B may form irregular light diffusing microstructures (not shown) through a surface roughening process. As such, the diffuser may not include the plurality of light-scattering particles 1024P. The surface roughening process may be performed merely on the surface S1024B in the second region R2; alternatively, the surface roughening process may be performed on the entire surface S1024B, and then a grinding process or a filling process is performed on the surface S1024B in the first region R1, so that the optical layer 1024 includes different structures in the first region R1 and the second region R2. The grinding process includes, for example, grinding the rough surface by a grinder to form a flat or substantially flat surface. The filling process includes, for example, forming a light-transmitting material layer on the surface 51024B in the first region R1, so as to turn the uneven rough surface into a flat or substantially flat surface. The refractive index of the light-transmitting material layer may be equal to or similar to the refractive index of the light-transmitting body 1024B, but is not limited thereto. For example, the light-transmitting material layer may be an adhesive layer, but is not limited thereto.

In some embodiments, the optical layer 1026 may be a prism sheet, such as a brightness enhancement film (BEF), but is not limited thereto. The prism sheet may correct the light beam transmission path, so as to achieve the effect of concentrating and enhancing brightness. For example, the prism sheet may include a light-transmitting body 1026B and a plurality of microstructures 1026M. The light-transmitting body 1026B may allow light beams to penetrate. For example, the material of the light-transmitting body 1026B may include PET, but is not limited thereto. The plurality of microstructures 1026M are disposed on the light-transmitting body 1026B and may correct the transmission path of the light beam by the principle of refraction. In some embodiments, the plurality of microstructures 1026M and the light-transmitting body 1026B may be integrally formed. For example, the plurality of microstructures 1026M and the light-transmitting body 1026B may be formed by molding, but are not limited thereto.

In some embodiments, the plurality of microstructures 1026M may be located in the second region R2, and the size, pitch, or shape of the plurality of microstructures 1026M in the second region R2 may change according to requirements. For example, the microstructures 1026M may be columnar microstructures, and the plurality of columnar microstructures may be arranged along the first direction D1, and the columnar microstructures may extend along the second direction D2. In other embodiments, the plurality of columnar microstructures may be arranged along the second direction D2, and the columnar microstructures may extend along the first direction D1.

The optical layer 1026 may include different structures in the first region R1 and the second region R2. As shown in FIG. 1, the optical layer 1026 may include a non-pattern structure in the first region R1 and may include a pattern structure in the second region R2. In FIG. 1, except for the light-transmitting body 1026B, the optical layer 1026 does not further include the microstructures 1026M in the first region R1. On the other hand, the optical layer 1026 further includes the plurality of microstructures 1026M in the second region R2 in addition to the light-transmitting body 1026B. By providing the microstructures 1026M outside the first region R1 (such as in the second region R2), the transmission of the light beam from outside the display device 10 to the optical sensor 12 is facilitated or the formation of stray light may be reduced, thereby improving the image quality obtained by the optical sensor 12. In other embodiments, in the non-pattern structure of the optical layer 1026, a filling process may also be performed to turn the uneven surface into a flat or substantially flat surface. The filling process may include forming a light-transmitting material layer on the uneven surface. The refractive index of the light-transmitting material layer may be equal to or similar to the refractive index of the light-transmitting body 1026B, but is not limited thereto. For example, the light-transmitting material layer may be an adhesive layer, but is not limited thereto.

In other embodiments, the light-transmitting body 1026B may have an opening (not shown) in the first region R1, and the opening serves as the non-pattern structure, but is not limited thereto.

In other embodiments, the number of the diffusers or prism sheets included in the backlight module 102 is not limited to one. For example, the optical layer 1024 and the optical layer 1026 may both be diffusers or may both be prism sheets. When the backlight module 102 includes two prism sheets, the extension direction of the microstructures of one prism sheet may be parallel to the first direction D1, and the extension direction of the microstructures of the other prism sheet may be parallel to the second direction D2, but the disclosure is not limited thereto. In addition, the optical layers of the backlight module 102 may be increased or decreased according to requirements. For example, the backlight module 102 may include a light guide plate, two diffusers, and two prism sheets, but is not limited thereto.

According to different requirements, the backlight module 102 may further include other elements or film layers. For example, the backlight module may further include a light-shielding element 1029. The light-shielding element 1029 is disposed in the second region R2 and close to the periphery of the first region R1, and is also adjacent to a junction I of the first region R1 and the second region R2. The light-shielding element 1029 may shield (for example, absorbing) the light beam, so as to reduce the formation of stray light or reduce the probability of light beams reaching human eyes at different angles. For example, the light-shielding element 1029 may include an ink or tape, and the method of forming the light-shielding element 1029 may include coating, printing, or laminating, but is not limited thereto.

In some embodiments, the light-shielding element 1029 may be disposed between the reflector 1020 and the optical layer 1022, and may be close to the periphery of the first region R1 and also adjacent to the junction I of the first region R1 and the second region R2, so as to reduce the reflectivity of the light beam here, thereby improving the uniformity of the light beam at the junction I of the first region R1 and the second region R2. In other embodiments, the light-shielding element 1029 may also be disposed between other film layers. In addition, in other embodiments, the backlight module 102 may also include a dual brightness enhancement film (DBEF), but is not limited thereto.

The switchable diffuser 104 is disposed between the display panel 100 and the backlight module 102. In some embodiments, the switchable diffuser 104 may be an electronically controlled switchable diffuser. The electrically controlled switchable diffuser may include two substrates (not shown), two conductive layers (not shown), and a display medium layer (not shown). The two substrates are disposed opposite to each other and may be light-transmitting substrates. The material of the light-transmitting substrate may include glass or plastic, but is not limited thereto. The two conductive layers are respectively disposed on the two substrates and located between the two substrates. The two conductive layers may include light-transmitting conductive layers, so as to improve light transmittance. For example, the two conductive layers may include light-transmitting conductive materials or metal meshes, but are not limited thereto. The display medium layer is located between the two conductive layers. The display medium layer may include polymer dispersed liquid crystal (PDLC), but is not limited thereto. When there is a voltage difference between the two conductive layers, the PDLC exhibits a transparent state. On the other hand, when there is no voltage difference (i.e., input voltage is 0) between the two conductive layers, the PDLC exhibits a scattering state. In other words, the switchable diffuser 104 may be switched between the scattering state and the transparent state by changing the input voltage.

In the display mode, the switchable diffuser 104 may be switched to the scattering state. In the scattering state, the switchable diffuser 104 scatters the light beam from the backlight module 102 so as to achieve a haze effect. The switchable diffuser 104 with a haze effect may shield the optical sensor 12 disposed corresponding to the first region R1, and helps to reduce the visibility of the optical sensor 12. In addition, because at least one of the plurality of optical layers has different structures in the first region R1 and the second region R2, the light beam is disuniform at the junction I of the first region R1 and the second region R2. The switchable diffuser 104 with a haze effect may improve the above-mentioned disuniformity and reduce the difference in visual effects between the first region R1 and the second region R2 or improve the overall light emission uniformity, so that the display device 10 provides good display image quality in the display mode. In the image acquisition mode, the switchable diffuser 104 may switch to the transparent state. In the transparent state, the switchable diffuser 104 facilitates the transmission of the light beam from outside the display device 10 to the optical sensor 12, so that the display device 10 may acquire clear images or videos in the image acquisition mode.

In some embodiments, the display device 10 may further include an upper polarizer 106 and a lower polarizer 108. The upper polarizer 106 and the lower polarizer 108 are respectively disposed on two opposite surfaces of the display panel 100, and the lower polarizer 108 is located between the switchable diffuser 104 and the display panel 100. The upper polarizer 106 and the lower polarizer 108 may have transmission axes perpendicular to each other, or the upper polarizer 106 and the lower polarizer 108 may have transmission axes parallel to each other. In some embodiments, the lower polarizer 108 may include an advanced polarization conversion film (APCF), but is not limited thereto.

The optical sensor 12 is disposed corresponding to the first region R1. For example, the optical sensor 12 may overlap the first region R1 in the normal direction D3 of the mobile device 1. The optical sensor 12 may receive light beams, so as to acquire external images or videos. For example, the optical sensor 12 may include a charge coupled device (CCD), a complementary metal oxide semiconductor (CMOS), or a photodiode, but is not limited thereto.

In some embodiments, the mobile device 1 may further include a light-emitting element 14. The light-emitting element 14 may be adjacent to the optical sensor 12. For example, the light-emitting element 14 may be disposed at the periphery of the optical sensor 12 and located in the first region R1, but is not limited thereto. The number of the light-emitting elements 14 and the relative configuration relationship (such as the spacing or arrangement) with respect to the optical sensor 12 may change according to requirements, and are not limited to the illustrations in the figures.

The light-emitting element 14 may enhance the brightness of the first region R1. For example, the light-emitting element 14 may include an OLED, a mini LED, a micro LED, a quantum dot LED, fluorescence, phosphor, other suitable materials, or a combination of the above, but is not limited thereto.

In FIG. 1, the film layers or elements in the backlight module 102 are designed as partitioned structures (i.e., non-pattern structures and pattern structures), so that the optical sensor 12 disposed under the display device 10 may receive the light beam from outside the display device 10. Since it is not necessary to form a slot on the front surface of the display device 10 to dispose the optical sensor 12, the display device 10 and the mobile device 1 may achieve full-screen display. In addition, the switchable diffuser 104 is used to shield the optical sensor 12 disposed corresponding to the first region R1, or to improve the disuniformity of light beam at the junction I of the first region R1 and the second region R2 resulting from the first region R1 and the second region R2 having different structures in at least one of the plurality of optical layers, which helps to reduce the difference in visual effects between the first region R1 and the second region R2. In this way, the display device 10 and the mobile device 1 may not only achieve full-screen display, but also have good display quality.

Figure 2:
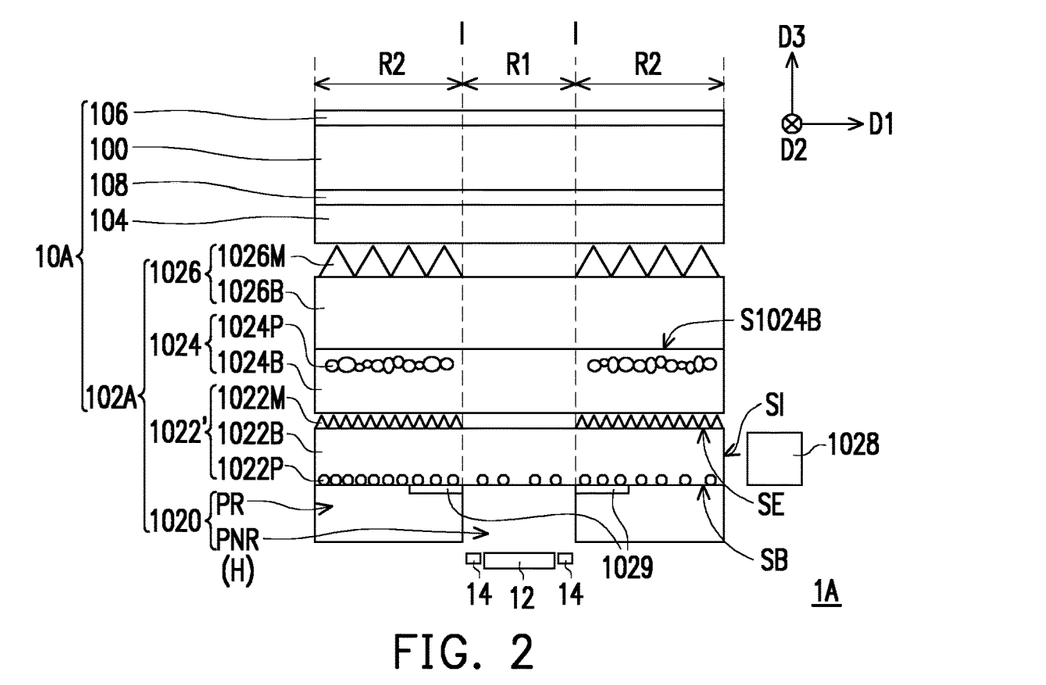

Referring to FIG. 2, the main difference between a mobile device 1A and the mobile device 1 of FIG. 1 is the structural design of a backlight module 102A of a display device 10A. In the backlight module 102A, the first region R1 of an optical layer 1022' (e.g., a light guide plate) includes a pattern structure different from the second region R2. Specifically, the plurality of dots 1022P of the optical layer 1022' are located in the first region R1 in addition to the second region R2, so as to enhance the brightness of the first region R1. In some embodiments, the density of the plurality of dots 1022P in the first region R1 is less than the average density of the plurality of dots 1022P in the second region R2 (that is, the total number of the dots 1022P located in the second region R2 divided by the total area of the second region R2), so as to balance the brightness and the image quality obtained by the optical sensor 12.

Referring to FIG. 3, the main difference between a mobile device 1B and the mobile device 1A of FIG. 2 is the structural design of a backlight module 102B of a display device 10B. In the backlight module 102B, an optical layer 1024' (e.g., a diffuser) includes an opening H' in the first region R1. Specifically, the opening H' is formed in a light-transmitting body 1024B' of the optical layer 1024', and the opening H' serves as a non-pattern structure of the optical layer 1024'.

In addition, the light-shielding element 1029 is further disposed between the optical layer 1022' and the optical layer 1024' and close to the opening H' of the first region R1, so as to further improve the uniformity of light beam at the junction I of the first region R1 and the second region R2.

Figure 4:
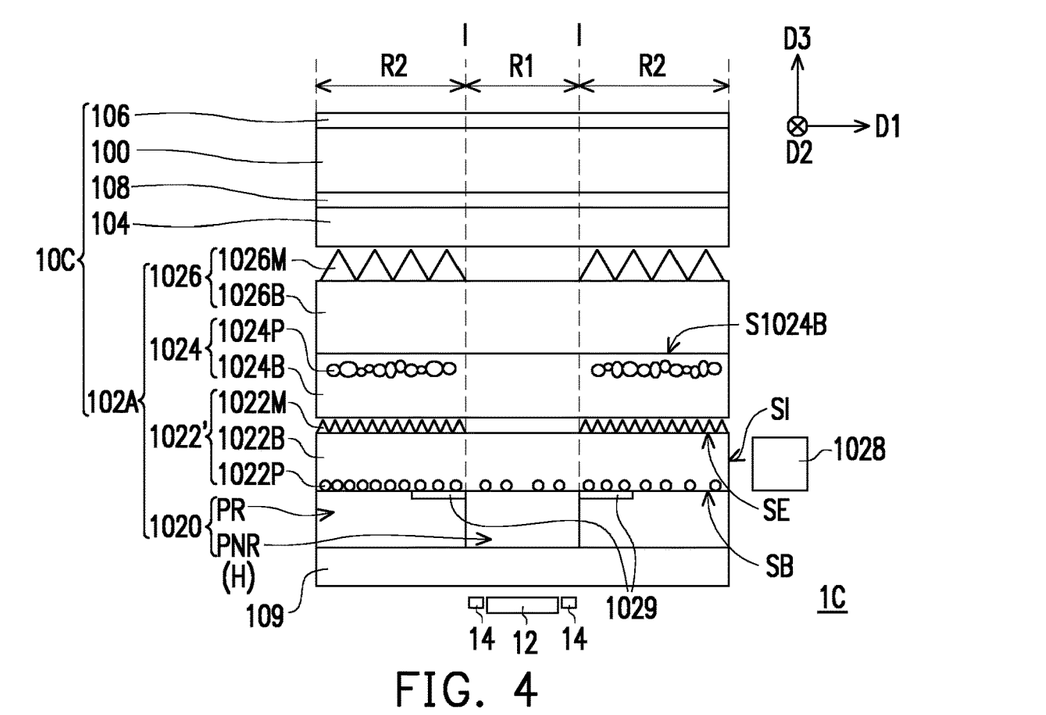

Referring to FIG. 4, the main difference between a mobile device 1C and the mobile device 1A of FIG. 2 is that a display device 10C further includes a switchable diffuser 109. The backlight module 102A is disposed between the switchable diffuser 104 and the switchable diffuser 109. The switchable diffuser 109 is disposed between the optical sensor 12 and the backlight module 102A, and the switchable diffuser 109 may operate synchronously with the switchable diffuser 104; that is, the switchable diffuser 109 may be switched to the scattering state or the transparent state together with the switchable diffuser 104. For the details of the switchable diffuser 109, reference may be made to the description of the switchable diffuser 104, which will not be repeated herein.

The arrangement of the switchable diffuser 109 may further shield the optical sensor 12 disposed corresponding to the first region R1, or improve the disuniformity of light beam at the junction I of the first region R1 and the second region R2 resulting from the first region R1 and the second region R2 having different structures in at least one of the plurality of optical layers, which helps to reduce the difference in visual effects between the first region R1 and the second region R2 or improve the uniformity of the display image.

Referring to FIG. 5, the main difference between a mobile device 1D and the mobile device 1B of FIG. 3 is that a display device 10D further includes the switchable diffuser 109. The switchable diffuser 109 is disposed between the optical sensor 12 and the backlight module 102B. For the operation and other details of the switchable diffuser 109, reference may be made to the above description, which will not be repeated herein.

Referring to FIG. 6, the main difference between a mobile device 1E and the mobile device 1B of FIG. 3 is the structural design of a backlight module 102E of a display device 10E. In the backlight module 102E, the plurality of dots 1022P of the optical layer 1022 are located in the second region R2 but not in the first region R1.

In summary of the above, in the embodiments of the disclosure, the film layers or elements in the backlight module are designed as partitioned structures, so that the optical sensor 12 may receive the light beam from outside the display device 10. Since it is not necessary to form a slot on the front surface of the display device to dispose an optical sensor, the display device and the mobile device can achieve full-screen display. In addition, the switchable diffuser is used to shield the optical sensor disposed corresponding to the first region, or to improve the disuniformity of light beam at the junction I of the first region R1 and the second region R2 resulting from the first region R1 and the second region R2 having different structures in at least one of the plurality of optical layers, which helps to reduce the difference in visual effects between the first region and the second region. In this way, the display device and the mobile device may not only achieve full-screen display, but also have good display quality.

In some embodiments, the backlight module may further include the light-shielding element, so as to reduce the formation of stray light or reduce the probability of light beams reaching human eyes at different angles. In some embodiments, the mobile device may further include the light-emitting element disposed at the periphery of the optical sensor, so as to enhance the brightness of the first region. In some embodiments, the first region of the light guide plate may include the plurality of dots, so as to improve the brightness of the first region. In some embodiments, the density of the plurality of dots in the first region is less than the average density of the plurality of dots in the second region, so as to balance the brightness and the image quality obtained by the optical sensor. In some embodiments, the diffuser may include the opening in the first region, so as to improve the image quality obtained by the optical sensor. In some embodiments, the display device may include the plurality of switchable diffusers, so as to further reduce the difference in visual effects between the first region R1 and the second region R2 or to improve the uniformity of the display image.

The above embodiments are only used to illustrate the technical solutions of the disclosure and are not intended to limit them. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

Although the embodiments of the disclosure have been disclosed above, it should be understood that any person skilled in the art may make changes, substitutions, and modifications without deviating from the spirit and scope of the disclosure, and the features of each implementation may be arbitrarily mixed and substituted to form other new embodiments. In addition, the scope of protection of the disclosure is not limited to the manufacturing process, machine, manufacturing, material composition, device, method, and steps in the specific embodiments described in the specification. Any person skilled in the art may realize from the content of the disclosure the current or future developed processes, machines, manufacturing, material composition, devices, methods, and steps, and as long as they may implement generally the same functions or obtain generally the same results in the embodiments described herein, they may be used according to the disclosure. Therefore, the scope of protection of the disclosure includes the above-mentioned manufacturing processes, machines, manufacturing, material composition, devices, methods, and steps. In addition, each claim constitutes an individual embodiment, and the scope of protection of the disclosure also includes the combination of each claim and embodiment. The scope of protection of the disclosure is subject to what the appended claims define.

What is claimed is:

1. A display device, comprising:
   a display panel;
   a backlight module having a first region and a second region, the backlight module comprising:
   a reflector having a non-reflecting portion in the first region and a reflecting portion in the second region;
   a plurality of optical layers disposed on the reflector; and
   a light-shielding element disposed in the second region and close to a periphery of the first region; and
   a switchable diffuser disposed between the display panel and the backlight module,
   wherein at least one of the plurality of optical layers comprises different structures in the first region and the second region.

2. The display device according to claim 1, wherein the at least one of the plurality of optical layers comprises a non-pattern structure in the first region.

3. The display device according to claim 2, wherein the at least one of the plurality of optical layers is one of a light guide plate, a prism sheet, and a diffuser.

4. The display device according to claim 1, wherein another one of the plurality of optical layers comprises an opening in the first region.

5. The display device according to claim 4, wherein the another one of the plurality of optical layers is a diffuser.

6. The display device according to claim 1, wherein the backlight module is an edge-lit backlight module.

7. The display device according to claim 1, wherein the non-reflecting portion is an opening penetrating the reflector.

8. The display device according to claim 1, further comprising:
another switchable diffuser, wherein the backlight module is disposed between the another switchable diffuser and the switchable diffuser.

9. The display device according to claim 8, wherein the another switchable diffuser and the switchable diffuser switch to a scattering state together or switch to a transparent state together.

10. A mobile device, comprising:
a display device, comprising:
a display panel;
a backlight module having a first region and a second region, the backlight module comprising:
a reflector having a non-reflecting portion in the first region and a reflecting portion in the second region; and
a plurality of optical layers disposed on the reflector; and
a switchable diffuser disposed between the display panel and the backlight module,
wherein at least one of the plurality of optical layers comprises different structures in the first region and the second region; and
an optical sensor disposed corresponding to the first region.

11. The mobile device according to claim 10, further comprising:
a light-emitting element adjacent to the optical sensor.

12. The mobile device according to claim 10, wherein the at least one of the plurality of the optical layers comprises a non-pattern structure in the first region.

13. The mobile device according to claim 12, wherein the at least one of the plurality of the optical layers is one of a light guide plate, a prism sheet, and a diffuser.

14. The mobile device according to claim 10, wherein another one of the plurality of optical layers comprises an opening in the first region.

15. The mobile device according to claim 14, wherein the another one of the plurality of optical layers is a diffuser.

16. The mobile device according to claim 10, wherein the backlight module further comprises:
a light-shielding element disposed in the second region and close to a periphery of the first region.

17. The mobile device according to claim 10, wherein the non-reflecting portion is an opening penetrating the reflector.

18. The mobile device according to claim 10, wherein the backlight module is an edge-lit backlight module.

19. The mobile device according to claim 10, wherein the display device further comprises:
another switchable diffuser, wherein the backlight module is disposed between the another switchable diffuser and the switchable diffuser.

* * * * *